(12) United States Patent
Lymberopoulos et al.

(10) Patent No.: US 9,529,915 B2
(45) Date of Patent: Dec. 27, 2016

(54) SEARCH RESULTS BASED ON USER AND RESULT PROFILES

(75) Inventors: Dimitrios Lymberopoulos, Bellevue, WA (US); Qiang Wu, Sammamish, WA (US); Jie Liu, Medina, WA (US); Li Jiang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 164 days.

(21) Appl. No.: 13/161,527

(22) Filed: Jun. 16, 2011

(65) Prior Publication Data

US 2012/0323876 A1 Dec. 20, 2012

(51) Int. Cl.
G06F 7/00 (2006.01)
G06F 17/30 (2006.01)

(52) U.S. Cl.
CPC .............................. *G06F 17/30867* (2013.01)

(58) Field of Classification Search
CPC ................... G06F 17/30867; G06F 17/30864; G06F 17/30035; G06F 17/30038; G06F 17/3005; G06F 17/30873; G06F 17/3053; G06F 17/30554; G06F 15/173; G06F 15/16; G06F 9/4446; G06Q 30/02; G06Q 10/06; H04L 29/08; H04L 67/20; H04L 67/306; H04L 67/26; H04N 21/4668
USPC ......................................... 707/732, 752, 784
See application file for complete search history.

(56) References Cited

U.S. PATENT DOCUMENTS

| | | | | |
|---|---|---|---|---|
| 5,848,396 | A * | 12/1998 | Gerace | G06Q 30/02 705/14.49 |
| 6,006,218 | A * | 12/1999 | Breese et al. | |
| 6,263,334 | B1 * | 7/2001 | Fayyad | G06F 17/30333 704/9 |
| 6,272,507 | B1 * | 8/2001 | Pirolli | G06F 17/30011 707/999.005 |
| 6,418,432 | B1 * | 7/2002 | Cohen | G06F 17/30707 |
| 6,584,468 | B1 * | 6/2003 | Gabriel et al. | |
| 6,647,381 | B1 * | 11/2003 | Li et al. | |
| 6,799,176 | B1 * | 9/2004 | Page | G06F 17/30728 |
| 6,981,040 | B1 * | 12/2005 | Konig | G06F 17/30867 707/E17.109 |

(Continued)

FOREIGN PATENT DOCUMENTS

KR 1020040006515 A 1/2004

OTHER PUBLICATIONS

Keyhanipour et al., "User Modeling for the Result Re-ranking in the Meta-Search Engines via Reinforcement Learning"; Intelligent Systems Design and Applications, 2007. ISDA 2007. Seventh International Conference on Digital Object Identifier: Publication Year: 2007, pp. 387-394.*

(Continued)

*Primary Examiner* — Daniel Kuddus
(74) *Attorney, Agent, or Firm* — Steve Wight; Sandy Swain; Micky Minhas

(57) ABSTRACT

A method includes receiving a search query from a user at a search engine. The method also includes performing a search responsive to the search query to obtain a set of results. The set of results is ordered at least partially based on a distance between a profile of a user and a profile of each result in the ordered set of results. At least one profile of a result is based on an aggregate of a plurality of user profiles.

15 Claims, 7 Drawing Sheets

(56) References Cited

U.S. PATENT DOCUMENTS

| | | | |
|---|---|---|---|
| 6,993,452 B2* | 1/2006 | Huang | G06F 17/18 702/110 |
| 7,023,979 B1* | 4/2006 | Wu et al. | 379/265.11 |
| 7,392,278 B2* | 6/2008 | Chen et al. | |
| 7,599,917 B2* | 10/2009 | Meyerzon | G06F 17/30864 |
| 7,676,034 B1* | 3/2010 | Wu et al. | 379/265.01 |
| 7,685,276 B2* | 3/2010 | Konig | G06F 17/30867 709/223 |
| 7,769,746 B2* | 8/2010 | Lu | G06F 17/3064 707/708 |
| 7,831,456 B2* | 11/2010 | Demir et al. | 705/14.45 |
| 7,974,971 B2* | 7/2011 | Lu | G06F 17/3064 707/713 |
| 8,112,454 B2* | 2/2012 | Aravamudan | G06F 17/30035 707/723 |
| 2002/0078045 A1* | 6/2002 | Dutta | G06F 17/30675 |
| 2004/0006515 A1* | 1/2004 | Brey et al. | 705/26 |
| 2004/0073505 A1* | 4/2004 | Wright | G06Q 40/08 705/36 R |
| 2004/0267700 A1* | 12/2004 | Dumais et al. | 707/2 |
| 2005/0097051 A1* | 5/2005 | Madill | G06Q 20/04 705/50 |
| 2005/0165753 A1* | 7/2005 | Chen et al. | 707/3 |
| 2006/0200435 A1* | 9/2006 | Flinn et al. | 706/12 |
| 2007/0173323 A1* | 7/2007 | Johnson et al. | 463/42 |
| 2007/0173325 A1* | 7/2007 | Shaw et al. | 463/42 |
| 2007/0185844 A1* | 8/2007 | Schachter | 707/3 |
| 2007/0203908 A1* | 8/2007 | Wang | G06F 17/30864 |
| 2007/0276859 A1* | 11/2007 | Aravamudan | G06F 17/30035 |
| 2008/0000964 A1* | 1/2008 | Flake et al. | 235/380 |
| 2008/0004949 A1* | 1/2008 | Flake et al. | 705/14 |
| 2008/0306937 A1* | 12/2008 | Whilte et al. | 707/5 |
| 2008/0316925 A1* | 12/2008 | Dolin | G06Q 30/02 370/232 |
| 2009/0083367 A1* | 3/2009 | Li et al. | 709/202 |
| 2009/0112915 A1* | 4/2009 | Lele et al. | 707/102 |
| 2009/0132340 A1* | 5/2009 | Demir et al. | 705/10 |
| 2009/0132365 A1* | 5/2009 | Gruenhagen et al. | 705/14 |
| 2009/0156209 A1* | 6/2009 | Franklin et al. | 455/435.2 |
| 2009/0164929 A1* | 6/2009 | Chen et al. | 715/769 |
| 2009/0217203 A1* | 8/2009 | Aravamudan | G06F 17/30035 715/811 |
| 2010/0082582 A1* | 4/2010 | Gao | G06F 17/30867 707/706 |
| 2010/0223015 A1* | 9/2010 | Phillips et al. | 702/24 |
| 2010/0223105 A1* | 9/2010 | Gassewitz et al. | 705/10 |
| 2010/0228715 A1* | 9/2010 | Lawrence | G06F 17/3053 707/706 |
| 2010/0250530 A1* | 9/2010 | Wang | G06F 17/30737 707/732 |
| 2010/0257150 A1* | 10/2010 | Lu et al. | 707/713 |
| 2010/0293175 A1* | 11/2010 | Vadrevu | G06F 17/30864 707/759 |
| 2011/0035464 A1* | 2/2011 | Dolin et al. | 709/217 |
| 2011/0040756 A1* | 2/2011 | Jones | G06F 17/30864 707/737 |
| 2012/0130814 A1* | 5/2012 | Hayes | G06Q 30/0256 705/14.54 |
| 2012/0158705 A1* | 6/2012 | Konig | G06F 17/30265 707/723 |

OTHER PUBLICATIONS

Xiang et al., "Context-Aware Ranking in Web Search", Retrieved at <<http://research.microsoft.com/en-us/people/djiang/sigir10.pdf>>, Proceeding of the 33rd international ACM SIGIR conference on Research and development in information retrieval, Jul. 19-23, 2010, pp. 8.

Sun et al., "Personalized Ranking for Digital Libraries Based on Log Analysis", Retrieved at <<http://yangsun.com/docs/personalizedranking.pdf>>, Proceeding of the 10th ACM workshop on Web information and data management, Oct. 30, 2008, pp. 16.

Liu et al., "Personalized News Recommendation Based on Click Behavior", Retrieved at www.google.com/research/pubs/archive/35599.pdf>>, Proceedings of the 15th international conference on Intelligent user interfaces, Feb. 7-10, 2010, pp. 10.

Bernecker et al., "Scalable Probabilistic Similarity Ranking in Uncertain Databases", Retrieved at <<http://ieeexplore.ieee.org/stamp/stamp.jsp?arnumber=05467070>>, IEEE Transactions on Knowledge and Data Engineering, vol. 22 No. 9, Sep. 2010, pp. 1234-1246.

Liu et al., "BingNow!—Microsoft Research," Retrieved at <<http://research.microsoft.com/en-us/projects/bingnow/>>, Microsoft Corporation, printed Jun. 15, 2011, 2 pages.

"International Search Report", Mailed Date: Feb. 14, 2013, Application No. PCT/US2012/041799, Filed Date: Jun. 10, 2012, pp. 12.

* cited by examiner

SEARCH RESULTS BASED ON USER AND RESULT PROFILES

BACKGROUND

As the amount of information available online (e.g., via local intranets and the Internet) increases, search engines may be more frequently used to locate information that is of interest. Some search engines may order search results that are identified in response to a search query based on user information. For example, to provide a more personalized search experience, search results may be ordered based on personal information provided by a user. However, constructing a personalized weighting algorithm for each user of a search engine may be difficult as the number of users and the number of available search results increases.

SUMMARY

Systems and methods of context-aware search are disclosed. The disclosed techniques may enable a search engine to consider personalization information on a per user basis in a manner that is scalable as the number of users and the number of available search results increases. The disclosed techniques may be used to personalize various types of search results, including but not limited to websites and webpages, local and national businesses, news stories, applications, and documents. Examples of information that may be used to personalize search results include, but are not limited to, temporal patterns (e.g., whether certain search results are more popular in the morning/evening or on weekdays/weekends), individual user preferences, mainstream public preferences, and spatial (e.g., geographic) characteristics.

The disclosed systems and methods may involve an "offline" mode that may occur independently of receiving a search query and an "online" mode that may be triggered by receipt of a search query. In the offline mode, search engine logs may be mined to extract features that are specific to search results (e.g., businesses), users, or to both search results and users. For example, each click made by a user of a search engine may be captured in a log, where each captured click includes information such as an identifier (ID) of the user making the click, a target of the click (e.g., a website or webpage that was clicked), a category of the click (e.g., "restaurant," "blog," "news website," etc.) a date/time of the click, and other information. Based on the captured clicks, a profile of each user may be constructed. The profile of a user may include a probability distribution function (PDF) representing how often the user clicked on targets in various search result categories. The clicks may also be used to construct a profile of search results (e.g., businesses). For example, the profile of a business may be formed by aggregating the profiles of individual users that clicked on the business. A PDF of a business may thus represent preferences or behavior of a "typical" or "average" user that clicked on the business. To illustrate, an initial categorization scheme may be provided by the user, provided by a third party, or "learned" based on content at webpages or websites associated with the search results. Starting with a set of probabilities associated with search results, user PDFs may be built, and then business PDFs may be built based on the user PDFs.

In the online mode, when a search query is received, the profile (e.g., PDF) of the user may be retrieved and/or weighted based on a user ID, user location, and timestamp of the search query. A profile of each search result (e.g., business) that the search engine identifies in response to the search query may also be retrieved. The search results may be ordered based on a distance between the user's profile and the profile of each identified search result, thereby forming a context-aware ranked list of search results. To illustrate, the user may search for local pizza restaurants and the user's profile may indicate that the user visits websites for Mexican restaurants more often than websites for Chinese restaurants. In this example, the list of search results may be ordered so that pizza restaurants whose "typical" user clicks on Mexican restaurants more often than Chinese restaurants are ranked higher than pizza restaurants whose "typical" user clicks on Chinese restaurants more often than Mexican restaurants. The ordered list of results may thus be personalized for the user and may prioritize restaurants that are predicted to be more personally relevant to the user.

BRIEF DESCRIPTION OF THE DRAWINGS

The present disclosure may be better understood, and its numerous features and advantages made apparent to those skilled in the art, by referencing the accompanying drawings.

The use of the same reference symbols in different drawings indicates similar or identical items.

DETAILED DESCRIPTION

Figure 1:
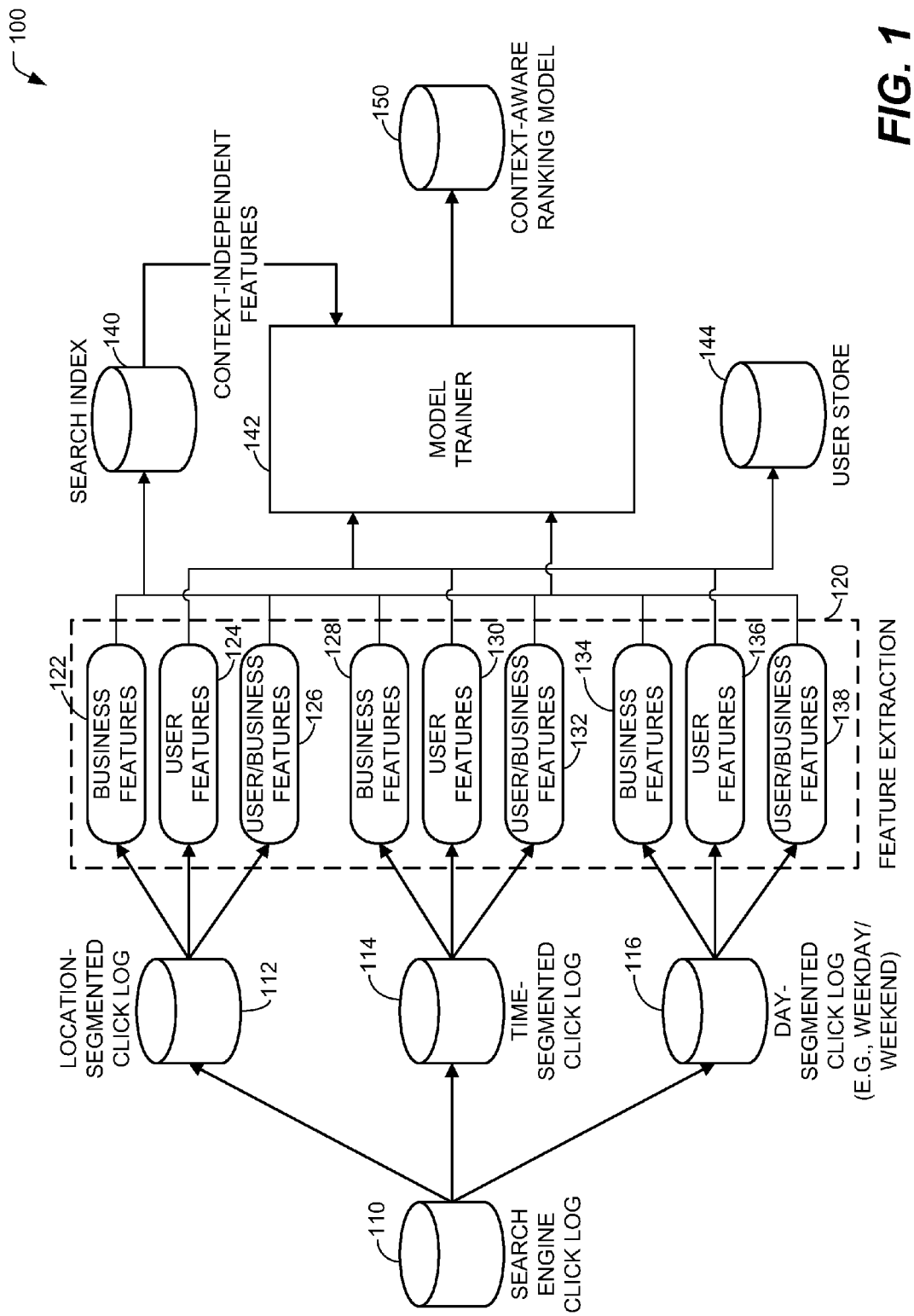
FIG. 1 is a diagram to illustrate a particular embodiment of a system to generate search results based on user and search result profiles.

In accordance with the disclosed systems and methods, profiles may be created for users and for search results and the profiles may be used to deliver personalized search results to the users. For example, a user profile may include a probability distribution function (PDF) that is generated based on previously logged clicks made by the user. The profile for a search result may include a PDF that is generated by aggregating PDFs of users that clicked on or otherwise indicated an interest in that search result. For example, the profile of a business may be generated by aggregating profiles of users that visited a website associated with the business. When a search query is received from a particular user, the search results returned to the particular user may be ordered based on distances (e.g., Kullback-Leibler (KL) distances) between the PDF of the user and the PDFs of each of the search results.

In a particular embodiment, a method includes receiving a search query from a user at a search engine. The method also includes performing a search responsive to the search query to obtain an ordered set of results. The ordered set of results is ordered at least partially based on a distance between a profile of a user and profiles of each result in the ordered set of results. At least one profile of a result is based on an aggregate of a plurality of user profiles.

In another particular embodiment, a computer system includes a processor and a memory storing instructions executable by a processor to store information received at a search engine from a plurality of users. The instructions are also executable by the processor to determine a probability distribution function for each of the plurality of users based on the stored information and to store the probability distribution function for each particular user in a user store. The instructions are further executable by the processor to determine a probability distribution function for each particular business of a plurality of businesses based on profiles of users that visited a website associated with the business via the search engine. The instructions are executable by the processor to store the probability distribution function for each particular business in a search index, to receive a search query from a user, and to perform a search responsive to the search query to obtain an ordered set of businesses. The ordered set of businesses is ordered at least partially based on a distance between the probability distribution function of the user and the probability distribution function of each business in the ordered set of businesses.

In another particular embodiment, a computer-readable storage medium includes instructions that, when executed by a computer, cause the computer to receive a search query from a user at a search engine, where the search query includes one or more search terms, a user identifier, and a user location. The instructions also cause the computer to determine a business category based on the one or more search terms and to perform a search responsive to the query to obtain a set of results. At least one result corresponds to a business associated with the business category and relevant to the user location. The instructions further cause the computer to retrieve a probability distribution function associated with the user based on the user identifier and the location and to retrieve a probability distribution function associated with the business corresponding to the at least one result. The probability distribution function associated with the user is based on user interactions with the search engine that are associated with the business category, and the probability distribution function associated with the business is based on probability distribution functions of users that visited a website associated with the business via the search engine. The instructions cause the computer to determine a distance between the probability distribution function associated with the user and the probability distribution function associated with the business. The instructions also cause the computer to order the set of results at least partially based on the distance of each of the results to produce an ordered set of context-aware results and to display the ordered set of context-aware results to the user.

Referring to FIG. 1, a particular illustrative embodiment of a computer system is illustrated and generally designated 100. The computer system 100 includes a feature extraction unit 120 and a model trainer 142. The computer system 100 further includes a search index 140 and a user store 144. The computer system 100 also includes a context-aware ranking model 150 that is created and trained by the model trainer 142. It should be noted that although the embodiment illustrated in FIG. 1 depicts training the context-aware ranking model 150 based on local business search results, the techniques disclosed herein may also be used with other types of search results, such as websites and webpages, national businesses, news stories, applications, and documents.

The feature extraction unit 120 may receive data and information captured by a search engine, by an electronic device (e.g., the computer system 100, a mobile phone, or another device), an application, or any combination thereof. For example, a search engine click log 110 may store clicks of a user of a search engine where the clicks are captured by the search engine. The feature extraction unit 120 may receive data from the search engine click log 110 or a segment thereof (e.g., representative location-segmented click log 112, time-segmented click log 114, and day-segmented click log 116).

In a particular embodiment, each click stored in the search engine click log 110 is represented by a data structure that identifies a user that performed the click (e.g., via a user identifier (ID)), a target of the click (e.g., a website or webpage that was clicked), and a category of the click (e.g., a business category, a website category, a document category, an application category, or another category). The data structure may also identify a date of the click, a time of the click, and a day of the click (e.g., what day of the week the click was captured or whether the click was captured on a weekday or a weekend). Additional characteristics of the click may also be stored in the search engine click log 110.

During operation, user click data from the segmented click logs 112, 114, and 116 may be provided to the feature extraction unit 120. The feature extraction unit 120 may extract, from each segmented click log, features that are specific to individual businesses (illustrated at 122, 128, and 134), features that are specific to individual users (illustrated at 124, 140, and 136), and features that are specific to both users and businesses (illustrated at 126, 132, and 138).

Data representing the business features 122, 128, and 134 and the user/business features 126, 132, and 138 may be provided to the search index 140. For example, the search index 140 may be a local search index that stores features from the feature extraction unit 120 and other information regarding businesses in a particular geographic region. To illustrate, context-independent features of a business may include a location, hours of operation, ratings (e.g., user ratings and third-party reviews), a description, and other context-independent information.

Data representing the user features 124, 136, and 138 may be provided to the user store 144. Such data may be used to formulate a profile for each user. For example, the user profile for a user may include a probability distribution function (PDF) or other representation of how frequently the user clicked on items associated with various businesses or categories of businesses (e.g., how often the user visits websites for pizza restaurants or for a specific pizza restaurant). Generating user profiles is further described with reference to FIGS. 2-6.

Data representing all of the features 122-138 extracted by the feature extraction unit 120 may be provided to the model trainer 142. The model trainer 142 may also receive context independent features from the search index 140, as illustrated. In a particular embodiment, the model trainer 142 may create and train the context-aware ranking model 150. For example, when the model trainer 142 is a Multiple Additive Regression Trees (MART) module, the model trainer 142 may train the context-aware ranking model 150 based on gradient boosting of decision trees.

For example, a ranking model of a search engine may be configured to rank search results generated by the search engine based on various factors. The model trainer 142 may encode the distance between a user profile and a business profile (e.g., as determined by Kullback-Leibler (KL) divergence or another metric) as an additional factor considered by the ranking model, thereby forming the context-aware ranking model 150. As explained above, the profile of a user may include a probability distribution function. The profile of each business may be based on an aggregate of a plurality of user profiles, where each user profile that is aggregated corresponds to a user that clicked on the business (e.g., a user that visited a website associated with the business via the search engine). The profile of a business may thus include a probability distribution function that represents an "average" or "typical" user that visited a website associated with the business via the search engine. Generating profiles of search results, such as businesses, is further described with reference to FIGS. 2-6.

In a particular embodiment, one or more of the components illustrated in FIG. 1 may be part of an "offline" architecture or mode of a search engine. To illustrate, the context-aware training model 150 may be generated independently of search queries received at the search engine. The context-aware ranking model 150 may be used during an "online" architecture or mode of the search engine to generate an ordered list of context-aware search results, as further described with reference to FIG. 3.

Figure 2:
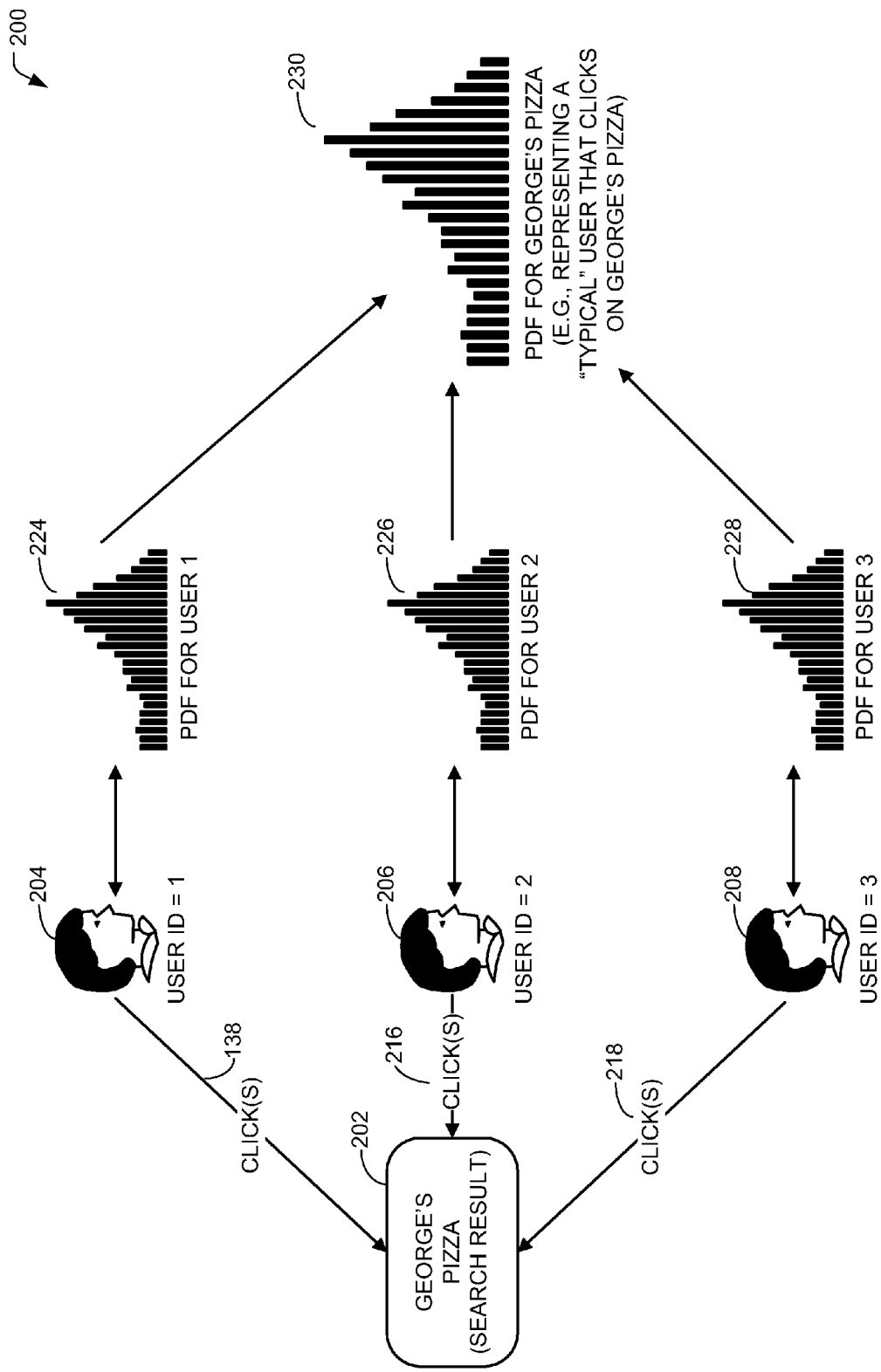
FIG. 2 is a diagram to illustrate a particular embodiment of a method of generating a profile of a business based on profiles of multiple users.

Referring to FIG. 2, a particular illustrative embodiment of a method of aggregating user probability distribution data with respect to a particular business is shown. The method is generally designated at 200 and described with reference to a representative business 202. The representative business (George's Pizza) may be a search result (e.g., local search result) that is stored in a local search index (e.g., the search index 140 of FIG. 1).

An initial categorization of businesses may be provided by a user, provided by a third party, or learned based on content of webpages or websites associated with the businesses. Starting with a set of probabilities associated with search results, user PDFs may be built, and then business PDFs may be built based on the user PDFs, as described herein.

Multiple users, such as representative users 204, 206, and 208, having user ID 1, user ID 2, and user ID 3, respectively, may have previously clicked on the George's Pizza website, as illustrated by representative click(s) 214, 216, and 218. For example, the George's Pizza website may have been included by the search engine in previous lists of search results provided to the users 204, 206, and 208. In a particular embodiment, the click(s) 214, 216, and 218 may be stored at a click log (e.g., the search engine click log 110 of FIG. 1).

Each of the users 204, 206, and 208 may have an associated user profile that includes a probability distribution function (PDF), such as the illustrated PDFs 224, 226, and 228, respectively. The PDFs 224, 226, and 228 are depicted in FIG. 2 using vertical bar histograms. In this example, each bar may represent a relative probability or preference of a user for a specific business (e.g., George's Pizza) and/or category of business (e.g., "restaurants" or "pizza restaurants").

The user PDFs 224, 226, and 228 may be aggregated to form an aggregated PDF 230 for George's Pizza. For example, each vertical bar in the aggregated PDF 230 may be an average of the corresponding vertical bars in each of the user PDFs 224, 226, and 228. The aggregated PDF 230 may thus represent a probability distribution function of categories of click information of an "average" or "typical" user that clicked on George's Pizza. In an alternate embodiment, the corresponding vertical bars in the user PDFs 224, 226, and 228 may be weighted non-equally.

For example, if the first user 204 and the second user 206 each click on Mexican restaurants more often than Chinese restaurants, and the third user 208 clicks on Greek restaurants more often than Chinese restaurants, then the "typical" user for George's Pizza (represented by the aggregate PDF 230) may prefer Mexican restaurants over Chinese restaurants to a greater extent than preferring Greek restaurants over Chinese restaurants. Thus, when a fourth user (not shown) having a similar profile to George's Pizza (i.e., Mexican restaurants>Greek restaurants>Chinese restaurants) searches for a pizza restaurant, George's Pizza may be ranked highly by a context-aware ranking model (e.g., the model 150 of FIG. 1). For example, George's Pizza may appear earlier in an ordered list of context-aware search results, because the KL divergence between the PDF 230 for George's Pizza and a PDF of the fourth user may be small.

It will be appreciated that the method 200 of FIG. 2 may be varied to prioritize other characteristics of businesses, users, and clicks. For example, more recent clicks to a business may be weighted more heavily than older clicks to a business. To illustrate, if the first user 204 visited the George's Pizza website more recently than the second user 206, then the first PDF 224 corresponding to the first user 204 may be weighted more heavily than the second PDF 226 corresponding to the second user 206 when computing the aggregate PDF 230.

As another example, if a search query is received at a particular date/time/day, clicks made at a similar date/time/day may be weighted more heavily. Thus, a user searching for a restaurant during lunchtime on a Wednesday may receive ordered search results that prioritize restaurants that are popular with a mainstream weekday lunch crowd (e.g., working professionals in the user's geographic area). A user searching for a restaurant on a Saturday night may receive ordered search results that prioritize restaurants that are popular with a mainstream weekend crowd.

As a further example, a search engine may store or have access to additional information regarding users, including demographic information such as age or age group. When such information is available, the information may be encoded in a click log or retrieved based on user ID. The information may also be used to demographically rank search results. For example, a fifteen year old user and a forty year old user may be recommended different restaurants, because certain restaurants may be more popular with teenagers and other restaurants may be more popular with adults.

Figure 3:
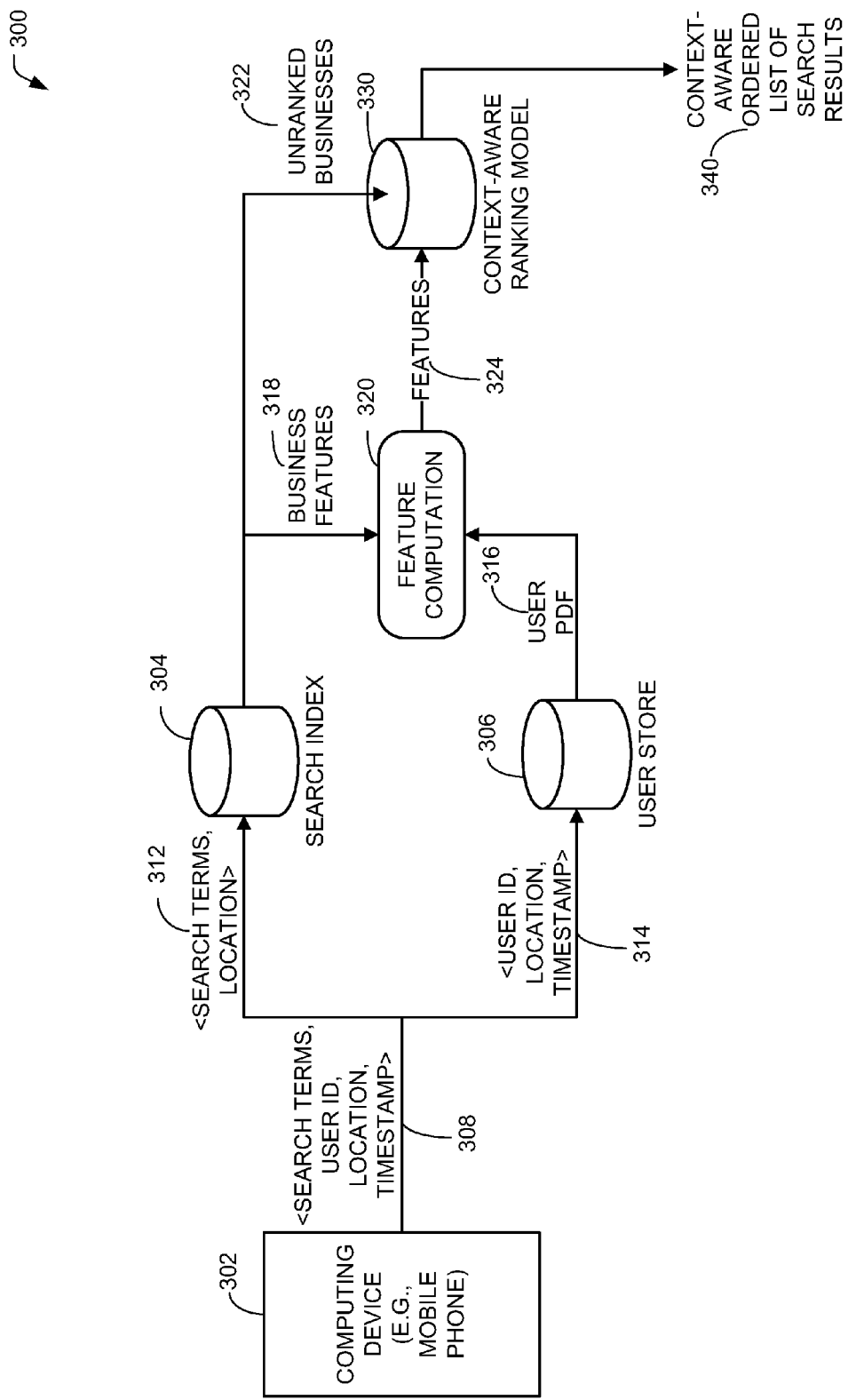
FIG. 3 is a diagram to illustrate another particular embodiment of a system to generate search results based on user and search result profiles.

Referring to FIG. 3, a particular illustrative embodiment of a system 300 is shown. The system 300 includes a computing device 302, a search index 304 (e.g., the search index 140 of FIG. 1), a user store 306 (e.g., the user store 144 of FIG. 1), a feature computation unit 320, and a context-aware ranking model 330 (e.g., the context-aware ranking model 150 of FIG. 1). In a particular embodiment, one or more of the components illustrated in FIG. 3 may be part of an "online" architecture or mode of a search engine. For example, the online architecture illustrated in FIG. 3 may be used in conjunction with the offline architecture illustrated in FIG. 1 to implement the context-aware search techniques disclosed herein.

In a particular embodiment, the computing device 302 may be a mobile phone (e.g., smartphone), as illustrated. Alternately, the computing device 302 may be another type of user device, such as a laptop computer, a tablet computer, or a portable multimedia player. During operation, when a user of the computing device 302 enters one or more search terms, the computing device 302 may output a search query 308. For example, the search terms may be provided to a search engine accessed by the computing device 302 via a web browser or other application. The search query 308 may include the search terms and additional information such as a user ID of the user, a location of the user (e.g., as determined by a global positioning system (GPS) transceiver of the computing device 302), and a timestamp.

The search terms and the location from the search query 308 may be provided to the search index 304, as illustrated at 312. Based on the search terms and the location, the search index 304 may provide business features to the feature computation unit 320. The user ID, the location, and the timestamp from the search query 308 may be provided to the user store 306, as indicated at 314. Based on the user ID, the location, and the timestamp, the user store 306 may provide a profile of the user of the computing device 302 to the feature computation unit 320. For example, the profile of the user may include a probability distribution function (PDF) 316 associated with the user.

The feature computation unit 320 may compute an overall set of features 324 based on the business features 318 and the user PDF 316. The feature computation unit 320 may provide the features 324 to the context-aware ranking model 330. For example, the features 324 may identify characteristics of a business that are predicted, based on the user PDF 316, to be prioritized by the user of the computing device 302. For example, characteristics common to businesses and business categories that have high probabilities in the user PDF 316 may be predicted as prioritized by the user.

In addition to the features 324, the context-aware ranking model 330 may receive data representing a set of unranked businesses 322 from the search index 304. As described with reference to data stored in the search index 140 of FIG. 1, each of the unranked businesses 322 may have an associated PDF that has previously been computed by aggregating user PDFs of users that clicked on the website of the business. The context-aware ranking model 330 may compute a distance (e.g., KL divergence) between the PDF of each business and the PDF 316 of the user. The context-aware ranking model 330 may rank the set of unranked businesses 322 based on the computed distances, thereby generating a personalized context-aware ordered list of search results 340.

In accordance with the described embodiments, a computer system may perform a computer-implemented method. The computer-implemented method may include receiving a query from a user at a search engine and performing a search responsive to the search query to obtain an ordered set of results. The ordered set of results may be ordered at least partially based on a distance between a profile of the user and a profile of each result in the ordered set of results. For example, the user of the computing device 302 may input search terms for the search query 308 and a search engine may receive the search query 308. In response to the search query 308, a search may be performed by the search engine to generate a set of results (e.g., list of businesses). The set of results may be ordered based on distance information that is determined by comparing a profile of the user and a profile of each result in the set of results generated by the search engine. A profile of at least one of the search results may be an aggregate multiuser result, such as the aggregate PDF 230 for George's Pizza, as illustrated in FIG. 2. Thus, a context-aware or personalized ordering of the search results may be presented.

The profile of each user may be determined by one or more actions performed by the user. For example, the one or more actions may include one or more click actions detected and stored by a search engine during use of the search engine by the user. It should be noted that search results may include results other than businesses, such as documents or applications. The probability distribution functions (PDFs) described herein may include a plurality of values associated with different categories. For example, a particular category may be assigned to each click generated by a particular user. The number of user clicks in each category may be accumulated and a total number of clicks per business per category may be maintained to generate the PDF for the user.

Figure 4:
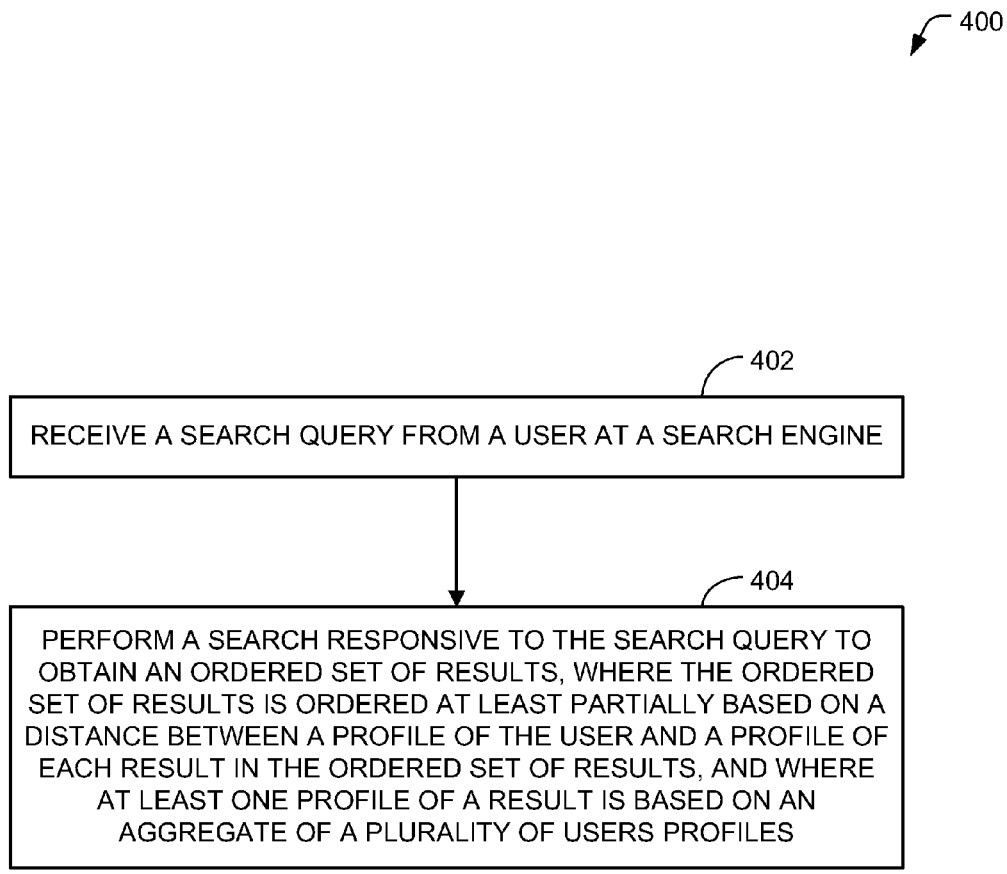
FIG. 4 is a flowchart to illustrate a particular embodiment of a method of generating search results based on user and search result profiles.

Referring to FIG. 4, a particular illustrative embodiment of a method 400 of generating customized search engine results is shown. The method 400 includes receiving a search query from a user at a search engine, at 402.

The method 400 further includes performing a search responsive to the search query to obtain an ordered set of results, at 404. The ordered set of results is ordered at least partially based on a distance between a profile of the user and a profile of each result in the ordered set of results. At least one profile of a result in the set of results is based on an aggregate of a plurality of user profiles. For example, at least one of the profiles may be an aggregate profile for a business listing of a business such as the business George's Pizza described in FIG. 2.

Figure 5:
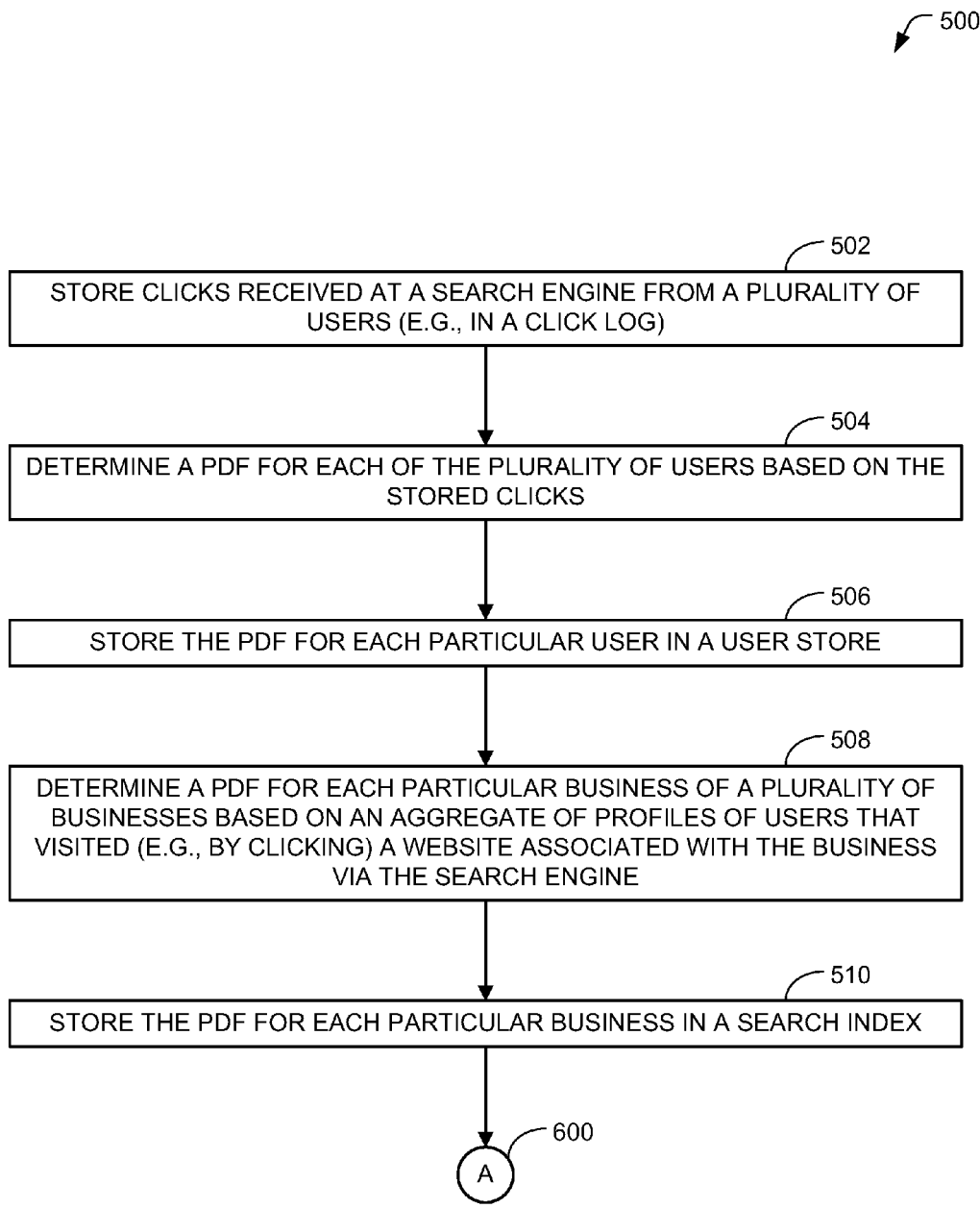
FIG. 5 is a flowchart to illustrate another particular embodiment of a method of generating search results based on user and search result profiles.
Figure 6:
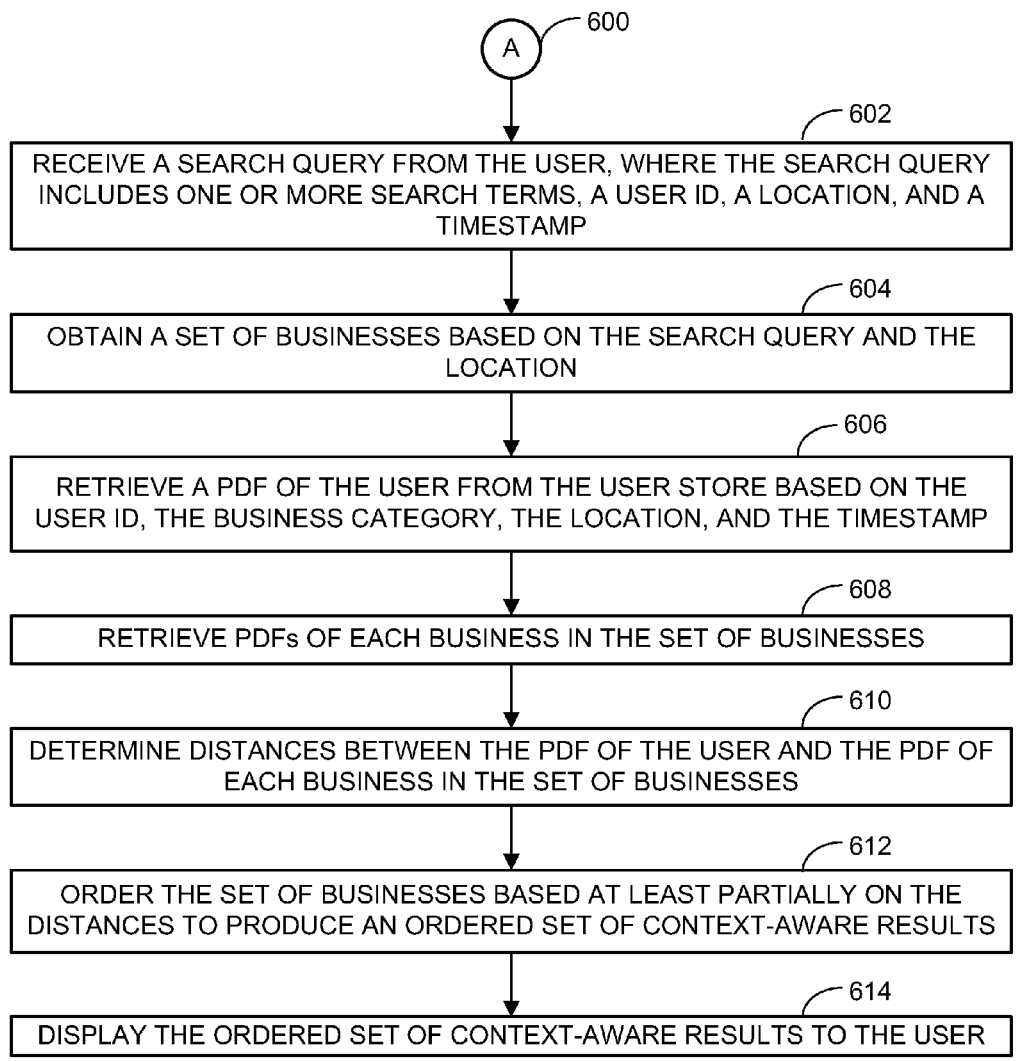
FIG. 6 is a flowchart to illustrate a continuation of the method of FIG. 5.

Referring to FIGS. 5-6, another embodiment of a method 500 of processing search engine data is shown, where the method 500 includes "offline" operations as illustrated in FIG. 5 and "online" operations as illustrated in FIG. 6.

The method 500 includes storing click data received at a search engine from a plurality of users, at 502. For example, the click data may be stored in a click log, such as the click log 110 of FIG. 1. The method 500 further includes determining a probability distribution function (PDF) for each of the plurality of users based on the stored clicks, at 504. The PDF for each particular user may be stored in a user store (e.g., the user store 144 of FIG. 1 or the user store 306 of FIG. 3), at 506.

The method 500 further includes determining a probability distribution function for each particular business of a plurality of businesses based on an aggregate of profiles of users that visited a website associated with the particular business via the search engine, at 508. For example, as illustrated in FIG. 2, the plurality of users 204-208 may have visited the website for George's Pizza, and an aggregate PDF 230 for George's Pizza may be generated.

The method 500 further includes storing the PDF for each particular business in a search index (e.g., the search index 140 of FIG. 1 or the search index 304 of FIG. 3), at 510. The method 500 proceeds at designator "A" 600 and is described further with reference to FIG. 6.

Referring to FIG. 6, the method 500 proceeds to and includes receiving a search query from the user, at 602. The search query includes one or more search terms, a user ID, a user location, and a timestamp. The method 500 also includes obtaining a set of businesses based on the search query and the location, at 604, and retrieving a PDF of the user from the user store based on the user ID, the business category, the location, and the timestamp, at 606.

The method 500 includes retrieving PDFs of each business in the set of businesses, at 608, and determining distances between the PDF of the user and the PDF of each business in the set of businesses, at 610. The set of business is ordered based at least partially on the distances to produce an order set of context-aware results, at 612. For example, the ordering may be performed by the context-aware ranking model 150 of FIG. 1 or the context-aware ranking model 330 of FIG. 3. The ordered set of context-aware results is displayed to the user, at 614. For example, the context-aware ordered list of search results 340 may be transmitted to and displayed by the computing device 302 of FIG. 3.

The method 500 of FIGS. 5-6 may thus enable context-aware ordering of search results such as businesses. For example, a search engine may consider personalization information on a per user basis in a manner that is scalable as the number of users and available search results increases, since such information may be considered by a single context-aware ranking model instead of training a separate ranking model or algorithm for each user. Search results may be contextually ranked based on temporal patterns (e.g., whether certain search results are more popular in the morning/evening or on weekdays/weekends), individual user preferences, mainstream public preferences, and spatial (e.g., geographic) characteristics.

Figure 7:
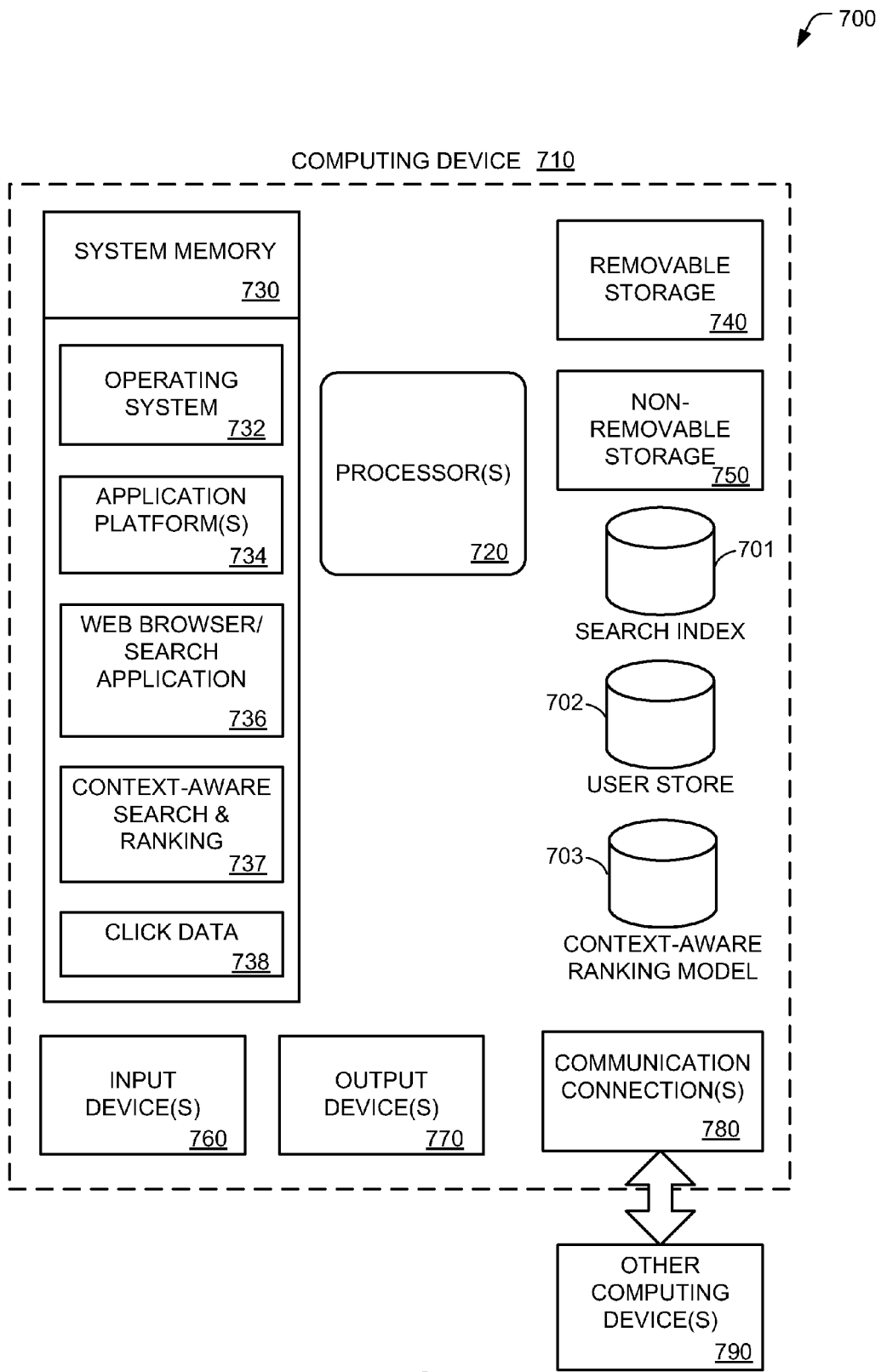
FIG. 7 is a block diagram to illustrate a particular embodiment of a computing environment including a computing device to support systems, methods, and computer program products described in FIGS. 1-6.

FIG. 7 depicts a block diagram of a computing environment 700 including a computing device 710 operable to support embodiments of systems, methods, and computer program products according to the present disclosure. For example, the system 100 of FIG. 1, the system 300 of FIG. 3, or components thereof may include or be implemented by the computing device 710 or components thereof.

The computing device 710 includes at least one processor 720 and a system memory 730. Depending on the configuration and type of computing device, the system memory 730 may be volatile (such as random access memory or "RAM"), non-volatile (such as read-only memory or "ROM," flash memory, and similar memory devices that maintain stored data even when power is not provided), or some combination of the two. The system memory 730 typically includes an operating system 732, one or more application platforms 734, one or more applications (e.g., represented in the system memory 730 by instructions that are executable by the processor(s) 720), and program data. For example, when the computing device 710 is a user device such as a personal computer or mobile phone (e.g., the computing device 302 of FIG. 3), the system memory 730 may include a web browser or search application 736 and click data 738, where the click data 738 is generated based on clicks captured at the user device. Alternately, when the computing device 710 is a search engine server, the system memory 730 may include a context-aware search and ranking module 737 and the click data 738, where the click data 738 includes click data generated by a plurality of users.

The computing device 710 may also have additional features or functionality. For example, the computing device 710 may include removable and/or non-removable additional data storage devices, such as magnetic disks, optical disks, tape devices, and standard-sized or flash memory cards. Such additional storage is illustrated in FIG. 7 by removable storage 740 and non-removable storage 750. Computer storage media may include volatile and/or non-volatile storage and removable and/or non-removable media implemented in any technology for storage of information such as computer-readable instructions, data structures, program components or other data. The system memory 730, the removable storage 740 and the non-removable storage 750 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 710. Any such computer storage media may be part of the computing device 710.

In a particular embodiment, the removable storage and 740 and the non-removable storage 750 are larger than the system memory 730. Thus, application platforms, applications, and program data may be copied or relocated from the storage 740-750 to the system memory 730 during operation. To illustrate, one or more of the system memory 730, the removable storage 740, and the non-removable storage 750 may be used to store the click logs 110-116 of FIG. 1, the search index 140 of FIG. 1, the user store 144 of FIG. 1, the model 150 of FIG. 1, the search index 304 of FIG. 3, the user store 306 of FIG. 3, the model 330 of FIG. 3, or any combination thereof. For example, the computing device 710 may include one or more of a search index 701 that stores search result PDFs, a user store 702 that store user PDFs, and a context-aware ranking model 703 that orders search results at least partially based on distances between a user PDF and search result PDFs.

The computing device 710 may also have input device(s) 760, such as a keyboard, mouse, pen, voice input device, touch input device, motion or gesture input device, etc, connected via one or more wired or wireless input interfaces. Output device(s) 770, such as a display, speakers, printer, etc. may also be connected via one or more wired or wireless output interfaces.

The computing device 710 also contains one or more communication connections 780 that allow the computing device 710 to communicate with other computing devices 790 over a wired or a wireless network. For example, when the computing device 710 is the computing device 302 of FIG. 3, the communication connection(s) 780 may be used to transmit the search query 308 of FIG. 3 to a search engine server and to receive the context-aware ordered list of search results 340 from the search engine server. Alternately, when the computing device 710 is a search engine server, the communication connection(s) 780 may be used to receive the search query 308 of FIG. 3 from the computing device 302 and to transmit the context-aware ordered list of search results 340 to the computing device 302.

It will be appreciated that not all of the components or devices illustrated in FIG. 7 or otherwise described in the previous paragraphs are necessary to support embodiments as herein described. For example, the removable storage 740 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, a calendar application may display a time scale including highlighted time slots or items corresponding to meetings or other events.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method comprising:
   receiving a search query from a particular user at a search engine, the particular user having a particular profile comprising a probability distribution function;
   performing a search responsive to the search query to obtain a set of results, each result having an associated profile comprising a probability distribution function, wherein the probability distribution function of each result is generated by aggregating probability distribution functions generated for each of a plurality of users who clicked on or otherwise indicated an interest in the result, and wherein the set of results includes a business listing having a profile comprising a probability distribution function, said probability distribution function for the business listing being computed by identifying a plurality of clicks associated with a website of the business, identifying a plurality of users based on the identified plurality of clicks, and determining the probability distribution function of the business listing by aggregating the probability distribution functions generated for the identified plurality of users;
   determining, for each result, a distance between the probability distribution function of the particular user profile and the probability distribution function of the result profile; and
   ordering the set of results based on the determined distances.

2. The method of claim 1, further comprising determining the profile of the particular user based on one or more actions associated with the particular user.

3. The method of claim 2, wherein the one or more actions include a click action detected by the search engine.

4. A computer system, comprising:
   a processor; and
   a memory storing instructions executable by the processor to:
   store information received at a search engine from a plurality of users, the stored information including user specific click log data corresponding to each user of the plurality of users;
   determine a probability distribution function for each user of the plurality of users based on the stored information including the user specific click log data corresponding to each user;
   store the probability distribution function for each of the plurality of users in a user store;
   determine a probability distribution function associated with each business of a plurality of businesses, wherein each probability distribution function associated with a corresponding business is generated by aggregating probability distribution functions generated for each of a plurality of users whose probability distribution functions are stored in the user store and who clicked on or otherwise indicated an interest in the business;
   store the probability distribution function for each particular business in a search index;
   receive a search query from a particular user; and
   perform a search responsive to the search query from the particular user based on the search index to obtain a set of results, the set of results identifying at least two of the plurality of businesses; and
   ordering the set of results at least partially based on a distance between the probability distribution function of the particular user and the probability distribution function of each business identified in the set of results.

5. The computer system of claim 4, further comprising a click log to store the information, the click log including at least one of a location-segmented click log, a time-segmented click log, or a day-segmented click log.

6. The computer system of claim 4, further comprising the search index.

7. The computer system of claim 4, further comprising the search engine.

8. The computer system of claim 5, wherein the instructions are further executable by the processor to segment the click log based on location.

9. The computer system of claim 5, wherein the instructions are further executable by the processor to segment the click log based on time.

10. The computer system of claim 5, wherein the instructions are further executable by the processor to segment the click log based on day.

11. A computer system, comprising:
a processor; and
a memory storing instructions executable by the processor to:
receive a search query from a particular user at a search engine, wherein the search query includes one or more search terms, a user identifier of the particular user, and a user location of the particular user;
determine a business category based on the one or more search terms;
perform a search responsive to the query to obtain a set of results, wherein the set of results identifies a plurality of businesses associated with the business category and relevant to the user location;
retrieve a probability distribution function associated with the particular user based on the user identifier and the location, wherein the probability distribution function associated with the particular user is based on user specific click log data;
retrieve, for each business of the plurality of businesses, a business probability distribution function, wherein each business probability distribution function is generated by aggregating probability distribution functions generated for each of a plurality of users who clicked on or otherwise indicated an interest in the business;
determine a distance associated with each business, the distance being based on the distance between the probability distribution function associated with the particular user and the business probability distribution function associated with the business;
order the set of results at least partially based on the distance associated with each business; and
display the ordered set of results to the particular user.

12. The system of claim 11, wherein the search query further includes a timestamp.

13. The system of claim 12, wherein the probability distribution function associated with the particular user is weighted based on the timestamp, the user location, or any combination thereof.

14. The system of claim 11, wherein the probability distribution function associated with the business represents an average user who clicked on or otherwise indicated an interest in the business.

15. The system of claim 11, wherein the search query is received at a particular time of day, wherein user clicks made at a similar time of day are weighted more heavily than user clicks at other times of day, and wherein the search engine has access to age information regarding the users.

* * * * *